(12) United States Patent
Watanabe et al.

(10) Patent No.: US 6,668,016 B1
(45) Date of Patent: Dec. 23, 2003

(54) MOVING IMAGE CODING METHOD AND APPARATUS, AND MOVING IMAGE CODING AND DECODING SYSTEM

(75) Inventors: Yasuhiko Watanabe, Kanagawa (JP); Hiroaki Aono, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/568,994

(22) Filed: May 11, 2000

(30) Foreign Application Priority Data

May 11, 1999 (JP) .......................................... 11-129614

(51) Int. Cl.[7] ................................................. H04B 1/66
(52) U.S. Cl. ................................................. 375/240.12
(58) Field of Search ....................... 375/240.01, 240.02, 375/240.03, 240.11, 240.12, 240.13, 240.22, 240.23, 240.25; 348/407.1, 413.1, 416.1, 845.1, 845.2, 419.1, 409.1; 395/200.77; 382/232, 234, 236; 386/111; H04N 7/12; H04B 1/66

(56) References Cited

U.S. PATENT DOCUMENTS

| 5,491,509 | A |   | 2/1996  | Jeong et al.    |            |
|-----------|---|---|---------|-----------------|------------|
| 5,815,209 | A | * | 9/1998  | Kando et al.    | 348/403.1  |
| 5,825,680 | A | * | 10/1998 | Wheeler et al.  | 364/761    |
| 5,920,359 | A | * | 7/1999  | Curley et al.   | 348/699    |
| 6,259,736 | B1| * | 7/2001  | Chujoh et al.   | 375/240.13 |
| 6,304,295 | B1| * | 10/2001 | Krishnamurthy et al. | 348/420.1 |
| 6,313,863 | B1| * | 11/2001 | Chida           | 348/14.1   |
| 6,333,948 | B1| * | 12/2001 | Kurobe et al.   | 375/240.13 |
| 6,339,617 | B1| * | 1/2002  | Ueda            | 375/240.16 |

FOREIGN PATENT DOCUMENTS

JP          7-38890        2/1995

* cited by examiner

*Primary Examiner*—Chris Kelley
*Assistant Examiner*—Tung Vo
(74) *Attorney, Agent, or Firm*—McDermott, Will & Emery

(57) ABSTRACT

A moving image coding method and its apparatus are disclosed, in which a frame of input image is divided into N regions so that each boundary may be short, one of the divided regions is selected in an arbitrary sequence in every frame to be coded, the coding mode is determined as intra-frame coding in this selected region, and the coding mode is determined by the characteristic of the frame image in other regions so as to code according to this coding mode.

12 Claims, 14 Drawing Sheets

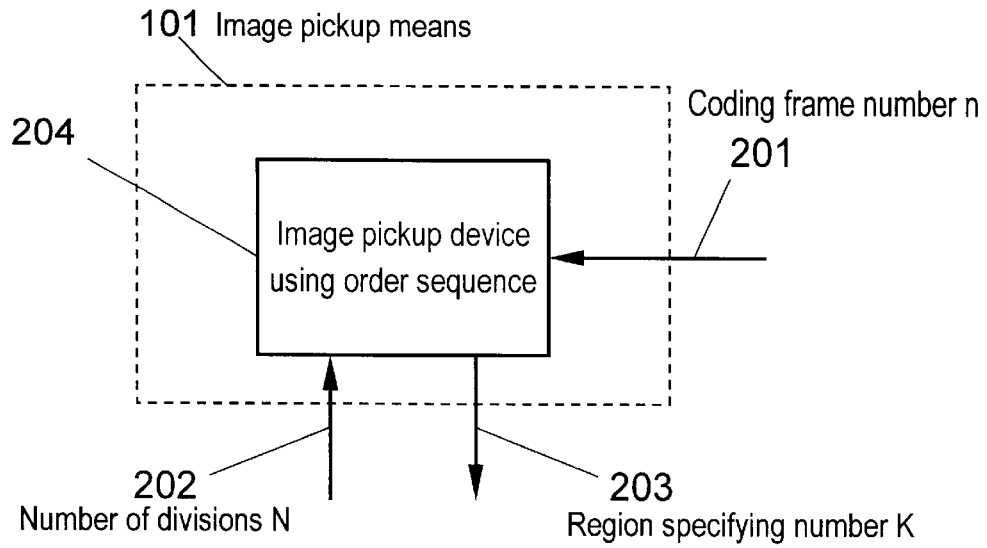
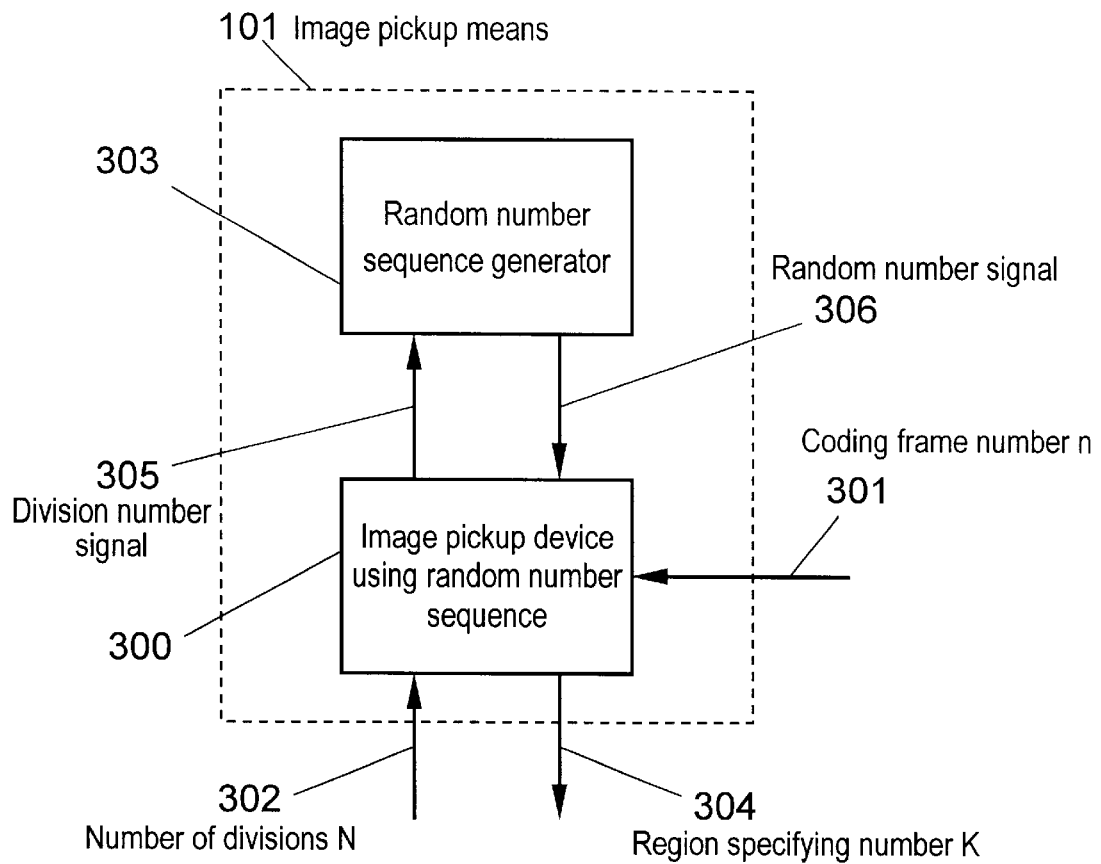

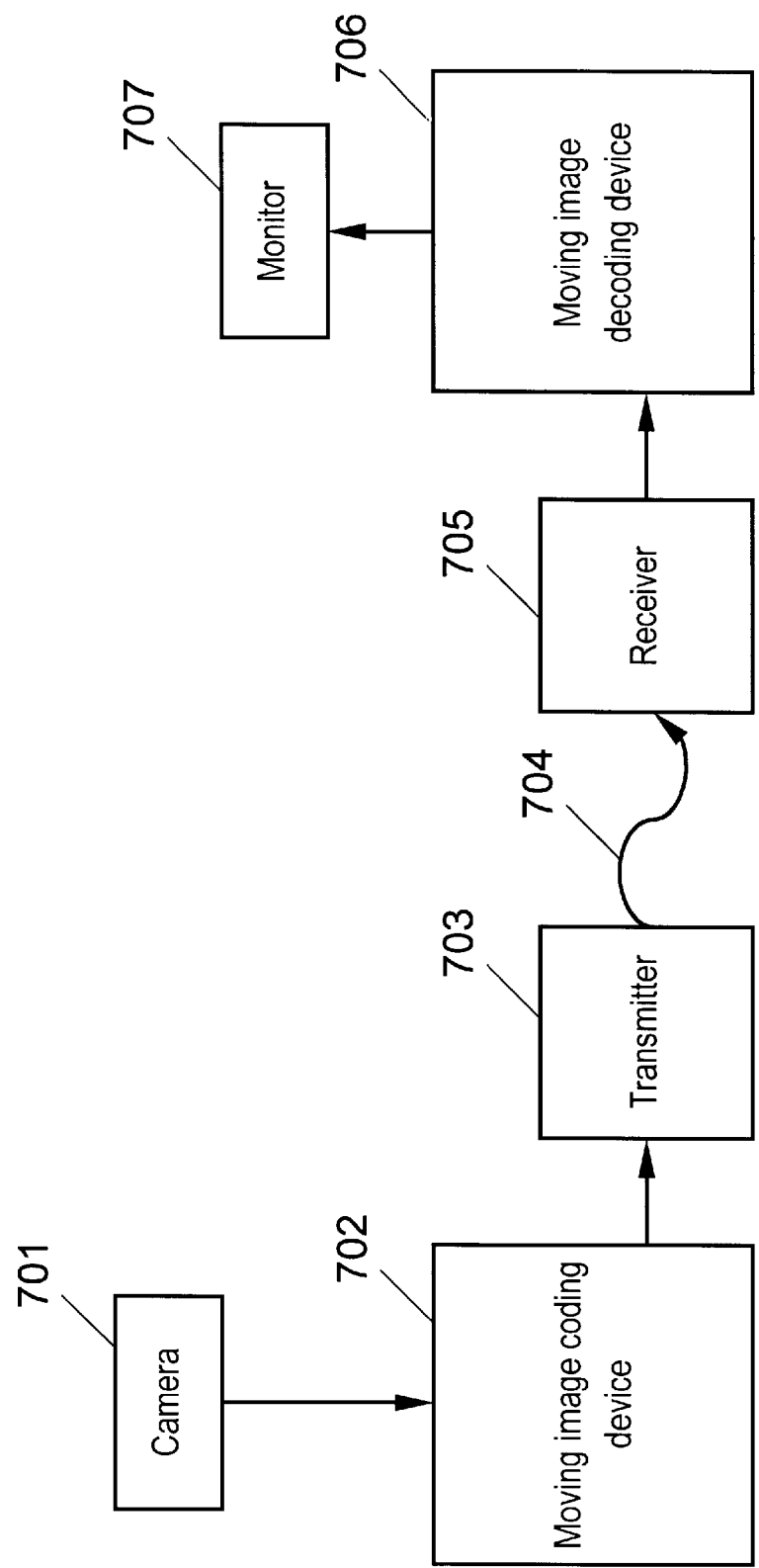

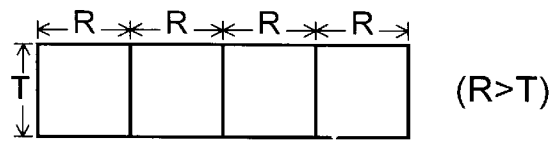
(R>T)
FIG. 13A
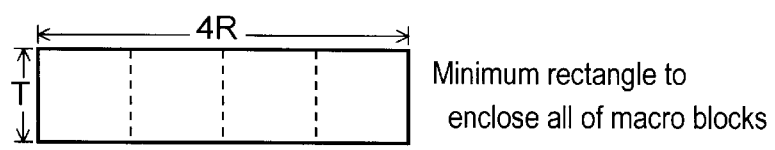
Minimum rectangle to enclose all of macro blocks
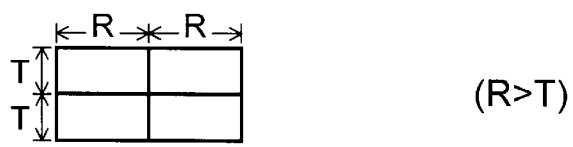
(R>T)
FIG. 13B
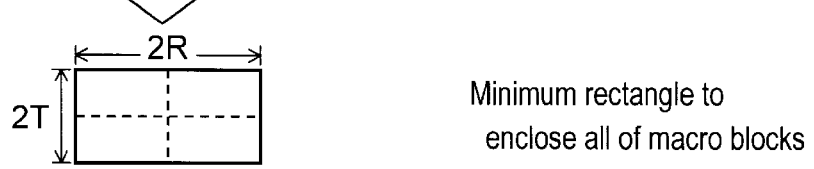
Minimum rectangle to enclose all of macro blocks
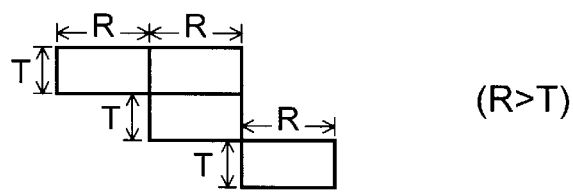
(R>T)
FIG. 13C
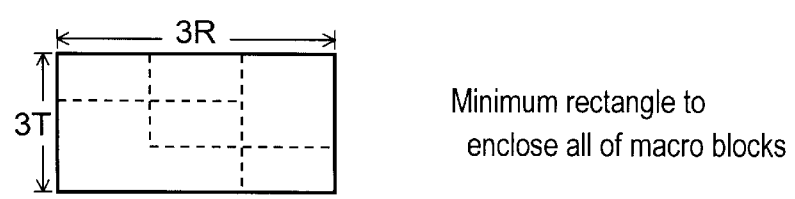
Minimum rectangle to enclose all of macro blocks Total sum of number of links = 12

Total sum of number of links = 10

MOVING IMAGE CODING METHOD AND APPARATUS, AND MOVING IMAGE CODING AND DECODING SYSTEM

FIELD OF THE INVENTION

The present invention relates to a method of coding a moving image and its apparatus, and a moving image coding and decoding system.

BACKGROUND OF THE INVENTION

For coding a moving image by a motion compensation inter-frame coding apparatus for coding for the purpose of communications or the like, hitherto, the method disclosed in the ISO/IEC JTC/SC29/WG11 MEPG93/457 Test Model 5 Rev. 2 (hereafter called TM5) is employed. The prior art by TM5 (intra-slice method) is described below.

FIG. 12 shows an example of dividing the frame for coding the digital image of ITU/R Rec. 601 525 format by the intra-slice method described in the TM5. In the intra-slice method, the intra-frame coding region is set in a region called a slice of which height is worth pixels of a natural number multiple of 16 (set at a multiple of one in FIG. 12), and width is the overall width of the frame. FIG. 12 shows an example of dividing into 30 regions comprising vertical 16 pixels×lateral 720 pixels, and each region is a unit for intra-frame coding. In FIG. 12, 30 slices are sequentially numbered 1 to 30 from the top of the frame, and each slice can be identified by the number.

In the intra-slice method, as shown in FIG. 12, when the coding frame number is 1, slice 1 is coded, when the coding frame number is 2, slice 2 is coded, and similarly when the coding frame number reaches 30, slice 30 is coded. When the slice reaches the lowest end of the frame, back to slice 1 at the highest end of the next coding frame, similarly thereafter, when the coding frame number is K, supposing the remainder of dividing K by 30 to be L, slice (L+1) is coded by intra-frame coding.

When coded in this manner, since motion is not compensated in the intra-frame coding region, the image quality is poor as compared with the region coded without intra-frame coding.

When coded by the intra-slice method, since the shape of the intra-frame coding region is long laterally, the contacting boundary of the region of intra-frame coding and the region not performing intra-frame coding in the frame is long, and the difference in image quality is very obvious. Besides, since the region of intra-frame coding moves periodically, periodic fluctuations occur in the image by decoding the coded result, and the subjective image quality of the decoded image deteriorates.

Thus, in the prior art, because of the shape of the region of intra-frame coding and periodic repeating of regions, periodic fluctuations occur in the image by decoding the coded result, and the image quality of the decoded image is inferior.

SUMMARY OF THE INVENTION

It is found that the subjective image quality is higher in the case of concentrated distribution of macro blocks of intra-frame coding than in the case of sparse distribution in the entire frame, and hence to solve the above problems, it is an object of the invention to enhance the image quality so that the difference in image quality between regions may be less obvious, by determining the regions of intra-frame coding so as to shorten the contacting boundary of the region of intra-frame coding and the region not performing intra-frame coding. In particular, in the case of coding by MPEG2, since there is a restriction that arbitrary macro blocks (MB) must be coded as intra MB within 132 frames, for example, when coding signals of Standard Television (STV) by MPEG2, since there are 44×30=1320 MB in the frames, in the case the number of forced intra MB being same in the frames, the frame must be divided at least into 132 divisions, and 10 forced intra MB must be disposed in the frame. Except in the case of the number of divisions of the frame being equal to the number of MB in the frame, the forced intra MB included in the frame of the invention may be disposed together, and the subjective image quality of coded image can be enhanced. Moreover, by determining the regions of intra-frame coding by an irregular sequence, periodic fluctuations by intra-frame coded portions can be eliminated, and a high image quality is achieved.

BRIEF DESCRIPTION OF THE DRAWINGS

FIG. 2 is a block diagram of image pickup means for composing a moving image coding apparatus in embodiment 2 of the invention.

FIG. 3 is a block diagram of image pickup means for composing a moving image coding apparatus in embodiment 3 of the invention.

FIG. 7 is a configuration diagram of a moving image coding and decoding system in embodiment 6 of the invention.

FIGS. 13A–13C are a diagram showing an example of a minimum rectangular shape for enclosing all of macro blocks.

DESCRIPTION OF THE PREFERRED EMBODIMENTS

Figure 1:
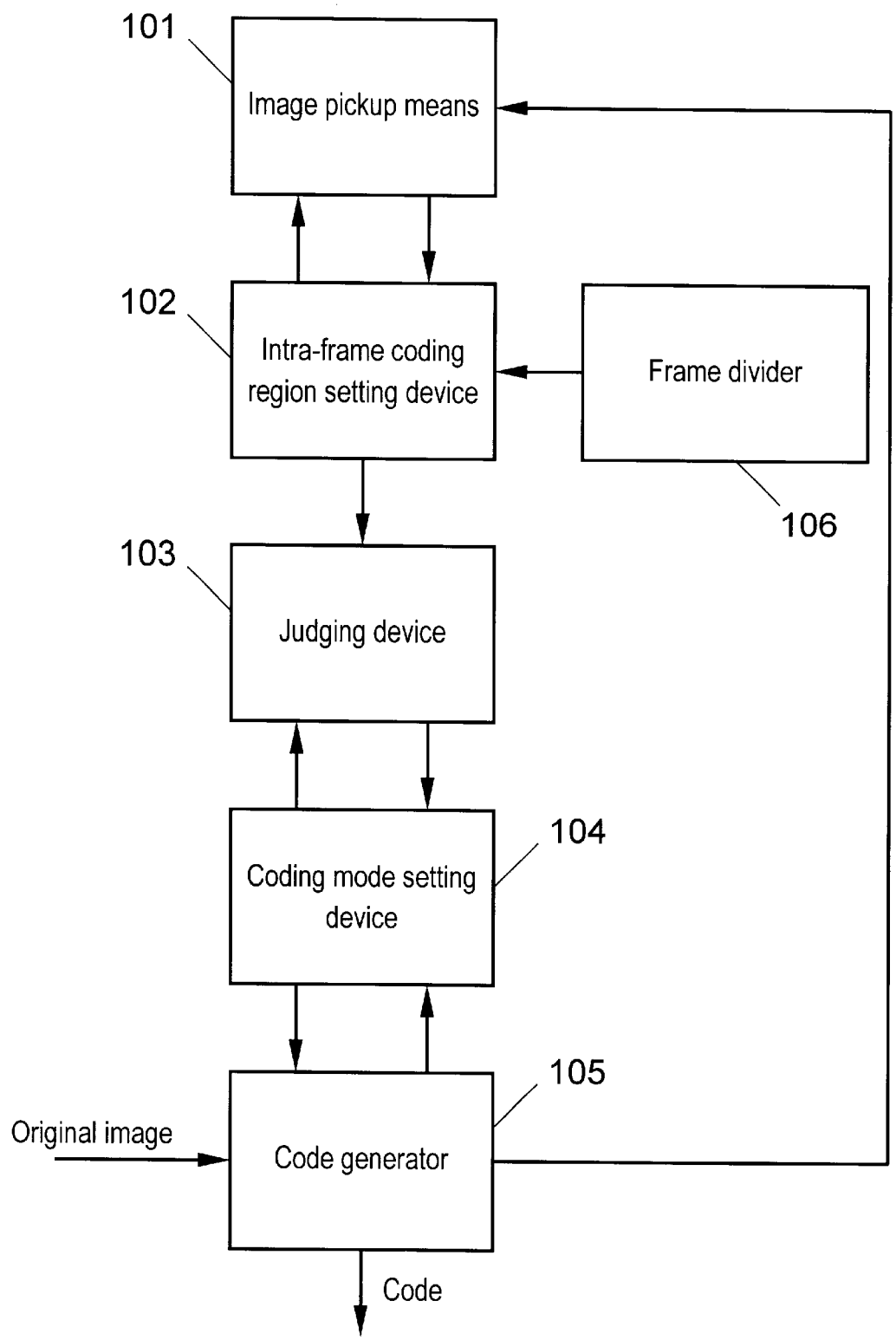
FIG. 1 is a block diagram of a moving image coding apparatus in embodiment 1 of the invention.

Referring now to the drawings, preferred embodiments of the invention are described below.

Embodiment 1

Embodiment 1 is explained by referring to an example of coding a digital image of ITU/R Rec. 601 525 format by MEPG2 SP@ML, which is one of moving image coding methods. In the invention, assuming coding by MEPG2 SP@ML, the macro block which is the basic unit of moving image coding by MPEG2 is MB, all MBs in the frame are numbered in the raster scan sequence (by natural numbers), and a specific MB is called by attaching a number (a) given to the MB, for example, MB(a). When a certain MB(a) corresponds to region specifying number (k), it is expressed as R (MB(a))=k.

FIG. 1 is a block diagram of a moving image coding apparatus in embodiment 1 of the invention. In FIG. 1, a frame divider 106 is for generating frame division information, which divides the frame into N regions before start of coding, and the number of divisions N is given to an intra-frame coding region setting device 102 for determining the region of intra-frame coding in every coding frame.

The intra-frame coding region is determined; for example, as follows.

In a first example, macro blocks are selected to form connected regions, and a minimum rectangular shape enclosing all of macro blocks is assumed, and a set of macro blocks of which longer side of the rectangle may be the minimum is determined as the intra-frame region.

Figure 16A:
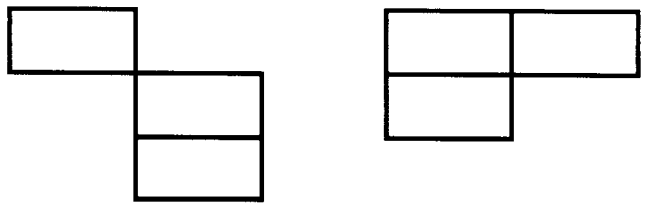
FIGS. 16A and 16B are a diagram explaining the linking region of macro blocks.
Figure 16B:

The connected region is a region composed of macro blocks contacting with each other by point or side. When macro blocks are contacting by point or side as shown in FIG. 16(a), connected regions are formed, but when macro blocks are contacting by point or side as shown in (b), connected regions are not formed.

Supposing there are four macro blocks, an example of a rectangle enclosing all of macro blocks is shown in FIG. 13.

In FIG. 13(a), macro blocks are arranged in a lateral line, and assuming a rectangle (square) for enclosing all of these macro blocks, the longer side of the rectangle (square) is 4R, where R is the length of the longer side of one macro block.

On the other hand, when arranged as shown in FIG. 13(b), the longer side of the minimum rectangle for enclosing all of the macro blocks is 2R, which is minimum.

In FIG. 13(c), one macro block is contacting only by point, and the rectangle for enclosing the macro block is larger than in the case of (b).

The rectangle includes a square.

In a second example, in the region coded by intra-frame coding, macro blocks are arranged in connected regions, supposing the area of the macro blocks included in the region to be M, assuming a minimum rectangle or square for enclosing the entire region, and supposing the longer side to be R, macro blocks are arranged so as to satisfy the relation of $Sqrt(M) \leq R \leq Sqrt(M) \times 1.3$, where Sqrt is the square root.

Figure 14:
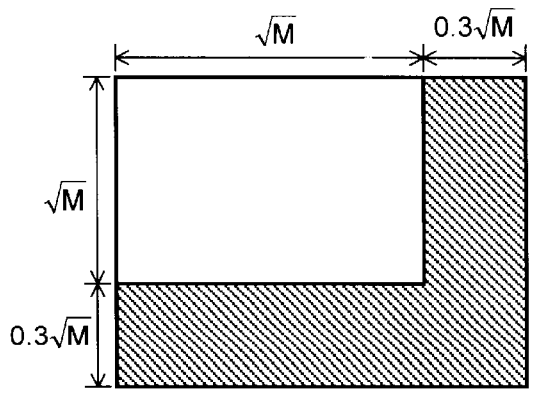
FIG. 14 is a diagram showing the relation between area of macro blocks and region of intra-frame coding.

This is satisfied when the minimum rectangle (square) enclosing the region of intra-frame coding may settle within the shaded area in FIG. 14.

In a third example, in the region coded by the intra-frame coding, macro blocks are arranged to be in connected regions. Concerning each macro block contained in this region at this time, not making macro block of which number of links is 0, the total sum of the number of links of each macro block is summed up in each macro block in the region, and the region is composed so that the sum may be maximum.

The number of links refers to the number of the contacting sides when the macro blocks in the region of intra-frame coding are contacting with other macro blocks in the same region by the side.

Figure 15A:
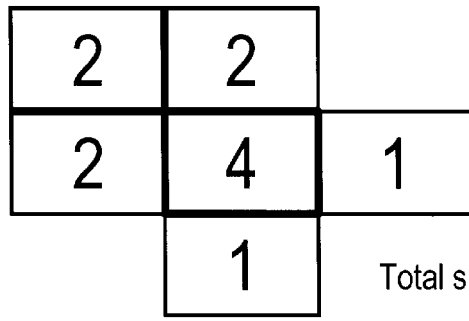
FIGS. 15A and 15B are a diagram showing the number of links of macro blocks.
Figure 15B:

For example, when macro blocks are formed as shown in FIG. 15, the number indicated in each macro block shows the number of links in each macro block. The region is formed so as to maximize the total sum of the number of links of macro blocks in the region coded by this intra-frame coding. The total sum is 12 in the case of FIG. 15(a), and 10 in the case of FIG. 15(b).

In a fourth example, in the region coded by the intra-frame coding, macro blocks are arranged to be in connected regions. The meaning of the connected region is as mentioned in relation to the first example. In each macro block included in the region at this time, not making macro block of which number of link is 0, when the number of MB included in the region is 6 or more, at least one macro block of which number of links is 3 is produced. This condition is satisfied in FIG. 15(a), but not in FIG. 15(b).

That is, in the arrangement in FIG. 15(b), the number of links of each macro block is 2 at most.

It is the principle of the invention to divide so that macro blocks may be existing in a concentrated distribution, and it is one of the techniques for realizing this.

Image pickup means 101 is to determine the region specifying number from the coding frame number in each coding frame, and from the coding frame given from a code generator 105 for generating code and reference image from the original image and the number of divisions N given from the intra-frame coding region setting device 102, the values from 1 to N are given to the region setting device 102 as the region specifying number k (natural number) according to an arbitrarily given sequence.

The intra-frame coding region setting device 102 issues the MB information corresponding to the region of the region specifying number k to a judging device 103 before starting coding of coding frame.

The judging device 103 is to judge whether the MB in coding is included in the intra-frame coding region or not, and on the basis of the MB information corresponding to the region of region specifying number k issued from the region setting device 102, the information that the MB(a) being presently coded entered from a coding mode setting device 104 for determining the coding mode from the feature of the image of the coding frame is R(MB(a))=k or R (MB(a))≠k, is issued to the setting device 104.

The coding mode setting device 104 judges the coding mode on the basis of the data of the original image given from the code generator 105, the data of reference image, and data of motion vector. At this time, if the output of the judging device 103 indicates intra-frame coding, regardless of the judging result of the coding mode, the data showing intra-frame coding is issued to the code generator 105. When the output of the judging device 103 indicates that intra-frame coding is not necessary, the judging result is sent to the code generator 105.

The coding mode is determined by the motion vectors and the number of bits generated by the code generator 105 and the statistics of the original image. For example, first, generating the square sum of the luminance component of original image, and differential image of the luminance component of original image and luminance component of the reference image position indicated by the motion vectors used at the time of motion compensation inter-frame coding, the square sum of the differential image is calculated. Next, comparing the square sum of the luminance component and square sum of the differential image, the coding mode is determined to perform intra-frame coding when the square sum of the luminance component is smaller, or perform the motion compensation inter-frame coding when not smaller.

The code generator 105 holds the data of original image and reference image, and calculates the data of original image, data of reference image, and data of motion vectors in each MB, and gives the results to the coding mode setting device 104, generates and issues codes according to the coding mode information given from the setting device 104, and updates the reference image. In this manner, intra-frame coding or motion compensation inter-frame coding is performed depending on the coding mode.

Embodiment 2

Embodiment 2 of the invention is same as embodiment 1 in configuration, but the structure of the image pickup means 101 is different. The section corresponding to the image pickup means 101 in FIG. 1 is shown in FIG. 2, and is explained below.

An image pickup device 204 using a number sequence receives frame number n (210) of coding frame from the code generator 105 before start of frame coding, and also receives the number of divisions N (202) of the frame from the intra-frame coding region setting device 102, and issues the region specifying number k for specifying the region of intra-frame coding in the coding frame. In this embodiment, when the entered coding frame number is n and the entered number of divisions of frame is N, the region specifying number k is determined as k=(1+(n mod N)), where (n mod N) is the remainder of dividing n by N.

In the embodiment, as the relation of the region specifying number k and coding frame number n, the corresponding relation is given by the formula k=(1+(n mod N)), but not limited to this, an arbitrary corresponding relation may be specified.

Embodiment 3

Embodiment 3 of the invention is same as embodiment 1 in configuration, but the structure of the image pickup means 101 is different. The section corresponding to the image pickup means 101 in FIG. 1 is shown in FIG. 3, and is explained below.

FIG. 3 is a block diagram of image pickup means 101 in embodiment 3. An image pickup device 300 using a random number sequence receives frame number n (301) of the coding frame from the code generator 105 before starting coding of the coding frame, and receives the number of divisions N of the frame from the intra-frame coding region setting device 102, gives the number of divisions N of frame to a random number generator 303, and issues a region specifying number k (304) for specifying the intra-frame coding region of the coding frame by a random number signal 306 issued from the random number generator 303. The random number generator 303 receives a division signal 305 of frame, and issues a random number signal 306 of one or more and not more than the number of divisions N of frame, generated by an arbitrary random number generating method.

Embodiment 4

Embodiment 4 of the invention is same as embodiment 1 in configuration, but the dividing method of the frame divider 106 is different. The dividing method is described while referring to FIG. 4 and FIG. 5.

Figure 4:
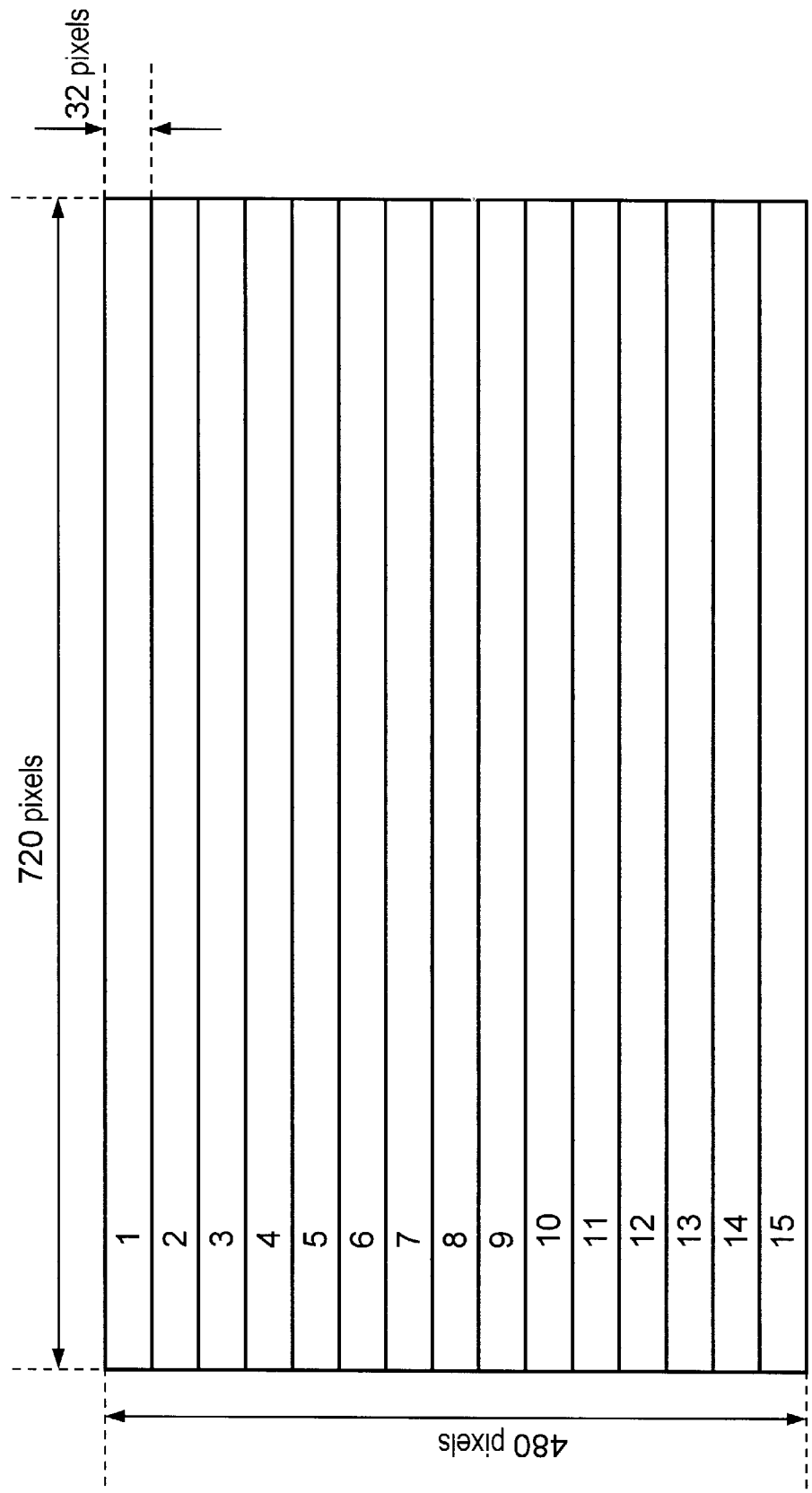
FIG. 4 is a diagram showing divisions of a frame in embodiment 4 of the invention.
Figure 5:
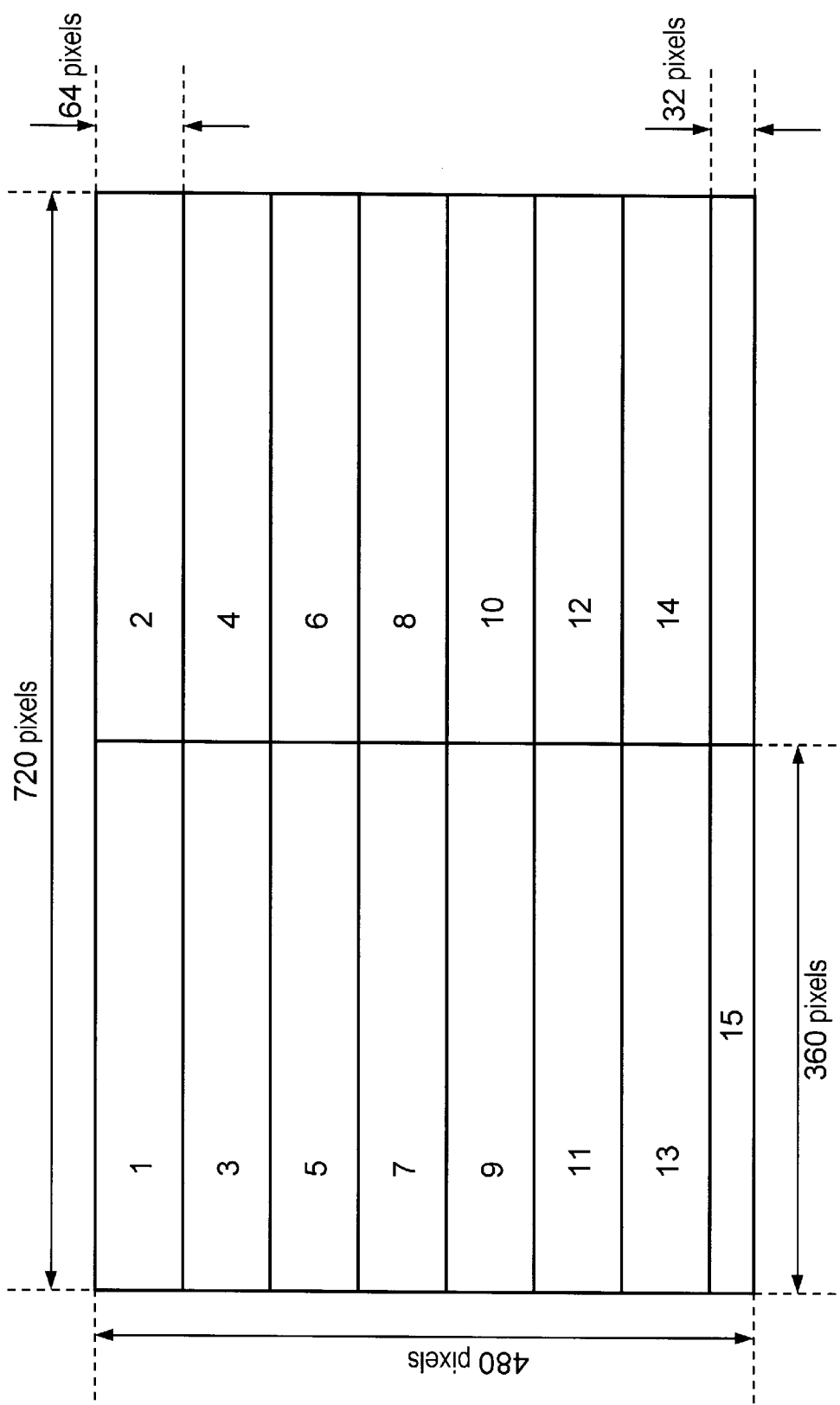
FIG. 5 is a diagram showing divided shapes of frame.

The frame divider 106 of the embodiment divides the frame in arbitrary shapes as shown in FIG. 4 and FIG. 5, and the divided regions are numbered from 1 to N or the number of divisions of frame. In FIG. 4 and FIG. 5, the number of divisions N of frame is both 15. The pixel size of the divided region is basically an integer multiple of MB in both main and sub-scanning directions.

Thus, the frame divider 106 issues the result of dividing the frame into N divisions to the intra-frame coding region setting device 102 shown in FIG. 1 in every MB as the division information forming a pair by each MB and the number of the region including the MB.

Embodiment 5

Figure 6A:
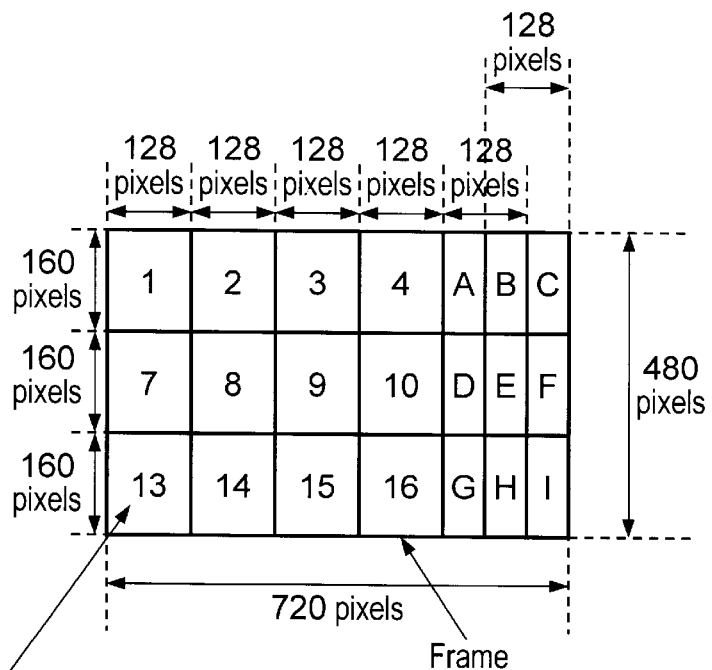
FIGS. 6A and 6B are a diagram showing divided shapes of frame in embodiment 5 of the invention.
Figure 6B:
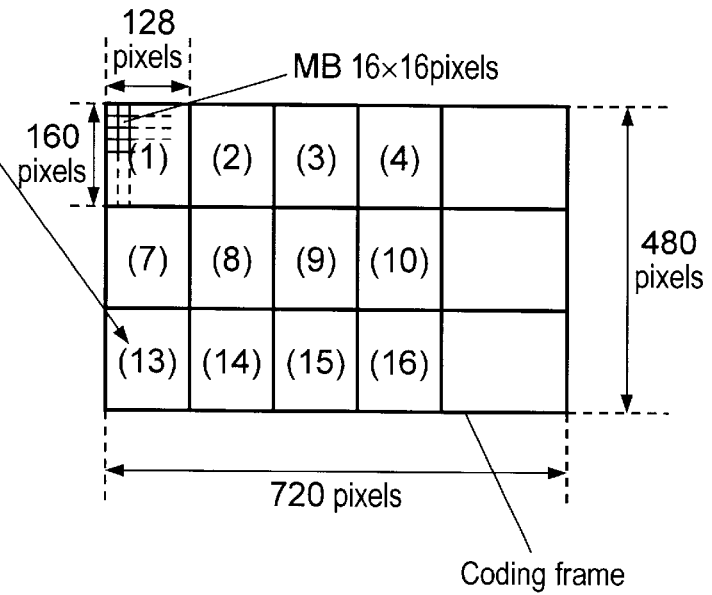

Embodiment 5 of the invention is same as embodiment 1 in configuration, but differs in the dividing method of the frame divider 106, and the dividing method is described while referring to FIG. 6. In the frame divider 106 in FIG. 1, for example, by dividing as shown in FIG. 6(*a*), the divided regions are numbered from 1 to N or the number of divisions of frame. In FIG. 6, the number of divisions N of frame is 15. Therefore in FIG. 6(*a*), when dividing the frame, it is divided into 18 regions of same shape composed of 80 MBs in each region. Therefore, in the divided regions, there are pixels belonging to plural regions.

That is, in FIG. 6(*a*), regions 1, 2, 3, 4, 7, 8, 9, 10, 13, 15, and 16 do not have pixels mutually common with other regions. These regions are coded simultaneously as the regions of intra-frame coding, whereas region 5 is composed of rectangular region A and rectangular region B, and region 6 is composed of rectangular region B and rectangular region C. Similarly, region 11 is composed of rectangular region D and rectangular region E, and region 12 is composed of rectangular region E and rectangular region F. Region 17 is composed of rectangular region G and rectangular region H, and region 18 is composed of rectangular region H and rectangular region I. These regions are simultaneously coded as the regions of intra-frame coding.

FIG. 6(*b*) shows the coding frame for coding the input image, being divided into MB units of 16×16 pixels. It is intended to judge whether or not to perform intra-frame coding depending on whether the MB subject to coding in the coding frame corresponds to the selected region of the frame in FIG. 6(*a*) or not.

Thus, as shown in FIG. 6(*a*), the frame is divided into 18 regions, and the regions are numbered from region 1 to region 18. When coding in every coding frame, the regions of intra-frame coding are coded from region 1 to region 18 in the ascending sequence, and after coding region 18 as the region of intra-frame coding, region 1 is coded next as the region of intra-frame coding. Thereafter, the regions are coded in the same sequence as the regions of intra-frame coding.

The frame in FIG. 6(*a*) was divided in the condition that the length of the boundary of the regions including all of these MBs be as short as possible. By thus dividing the regions to shorten the length of the region boundary, and coding each region by intra-frame coding, the image quality difference is less obvious between the region of intra-frame coding and region of motion compensation inter-frame coding. In the embodiment, the number of MB contained in each region is 80, and the shape of the divided regions is the same, but the number and shape of the MB included in the region are not specified.

Thus, the frame divider 106 issues the result of dividing the frame into N divisions to the intra-frame coding region setting device 102 in FIG. 1 as pair of each MB and number of the region containing MB. In this case, the pair of region 5 and region 6 corresponding to the MB contained in the rectangular region B, region 11 and region 12 corresponding to the MB contained in the rectangular region E, and region 17 and region 18 corresponding to the MB contained in the rectangular region H are issued to the intra-frame coding region setting device 102 in FIG. 1, in the pair of two types each.

Embodiment 6

Embodiment 6 of the invention is described below while referring to the structural diagram of a moving image coding and decoding system shown in FIG. 7.

In FIG. 7, a moving image pickup device 701 such as camera takes the moving image, and issues the obtained moving image signal to a moving image coding device 702 as digital image of ITU/R Rec. 601 525 format or other digital moving image signal. The moving image coding device 702 codes the entered digital signal, and issues the coded result to a transmitter 703. As the moving image coding device, the motion compensation inter-frame coding device conforming to MPEG2, or the moving image coding device of embodiment 1 to 5 is used.

The transmitter 703 provides the code entered from the moving image coding device 702 with an error correction code, and sends to a receiver 705 through a transmission route 704. The receiver 705 corrects error from the signal entered through the transmission route 704, and sends the result to a moving image decoding device 706.

The moving image decoding device 706 is the moving image decoding device corresponding to the coding system of the moving image coding device 702, and the signal issued from the receiver 705 is decoded, and issued to a monitor 707.

Embodiment 7

Figure 8:
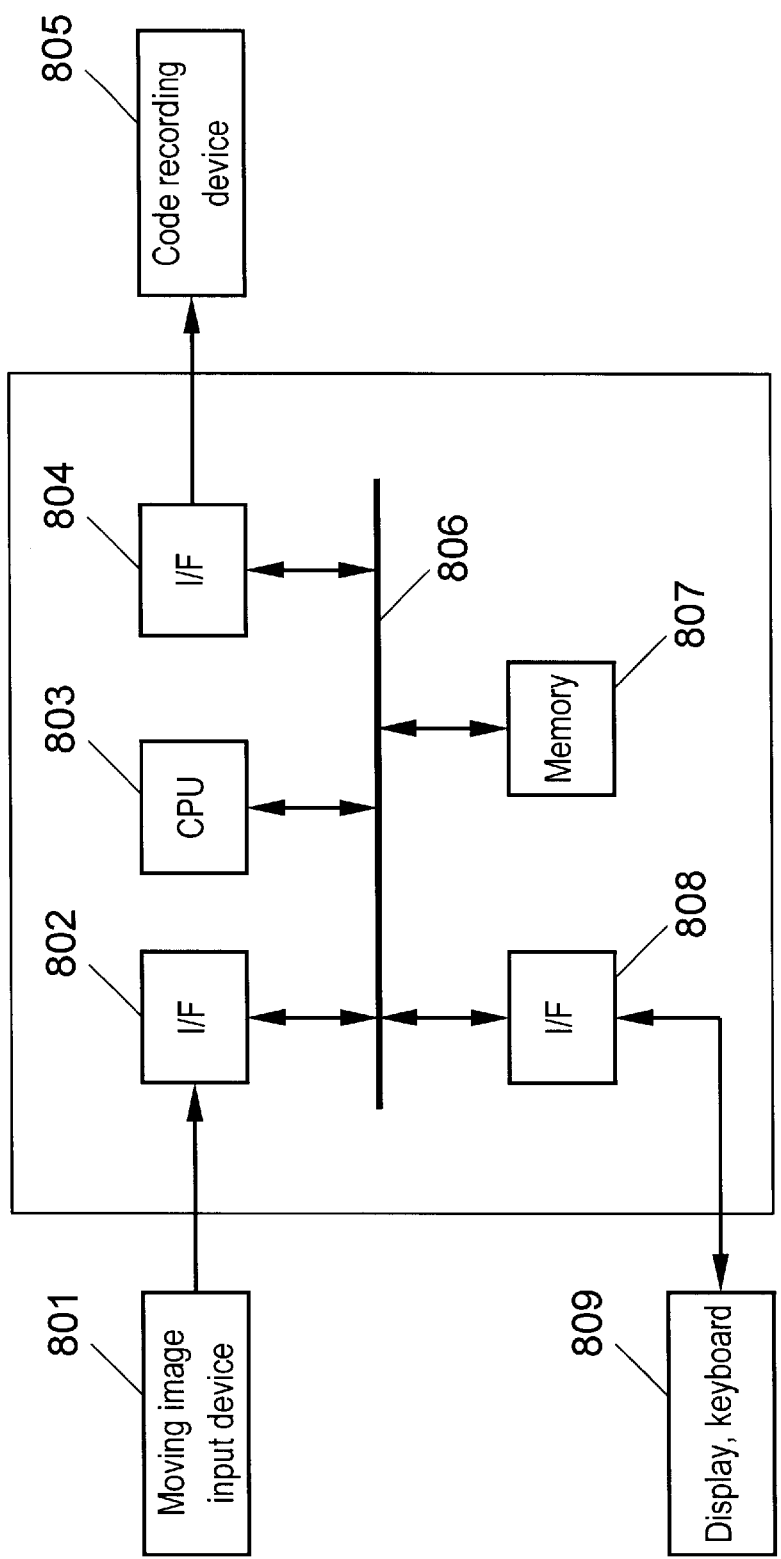
FIG. 8 is a configuration diagram of a computer for realizing a moving image coding apparatus in embodiment 7 of the invention.

Embodiment 7 is an example of realizing the moving image coding device by a computer system, and its configuration is shown and explained in FIG. 8.

In FIG. 8, a moving image signal entered into an I/F 802 from a moving image input device 801 is converted into a digital signal, and the data is transferred to a bus device 806 of the computer. A signal to the display for presenting the state of the computer to the user of the computer, and a signal from a keyboard for presenting the instruction from the computer user to the computer are connected to the bus device 806 through I/F 809 and I/F 808. The data necessary for executing the computer program including the input result of the moving image is stored in a memory 807. The computer program is executed by a CPU 803, and the moving image is coded, and the result is transmitted to a code recorder 805 or transmitter through an I/F 804.

Figure 9:
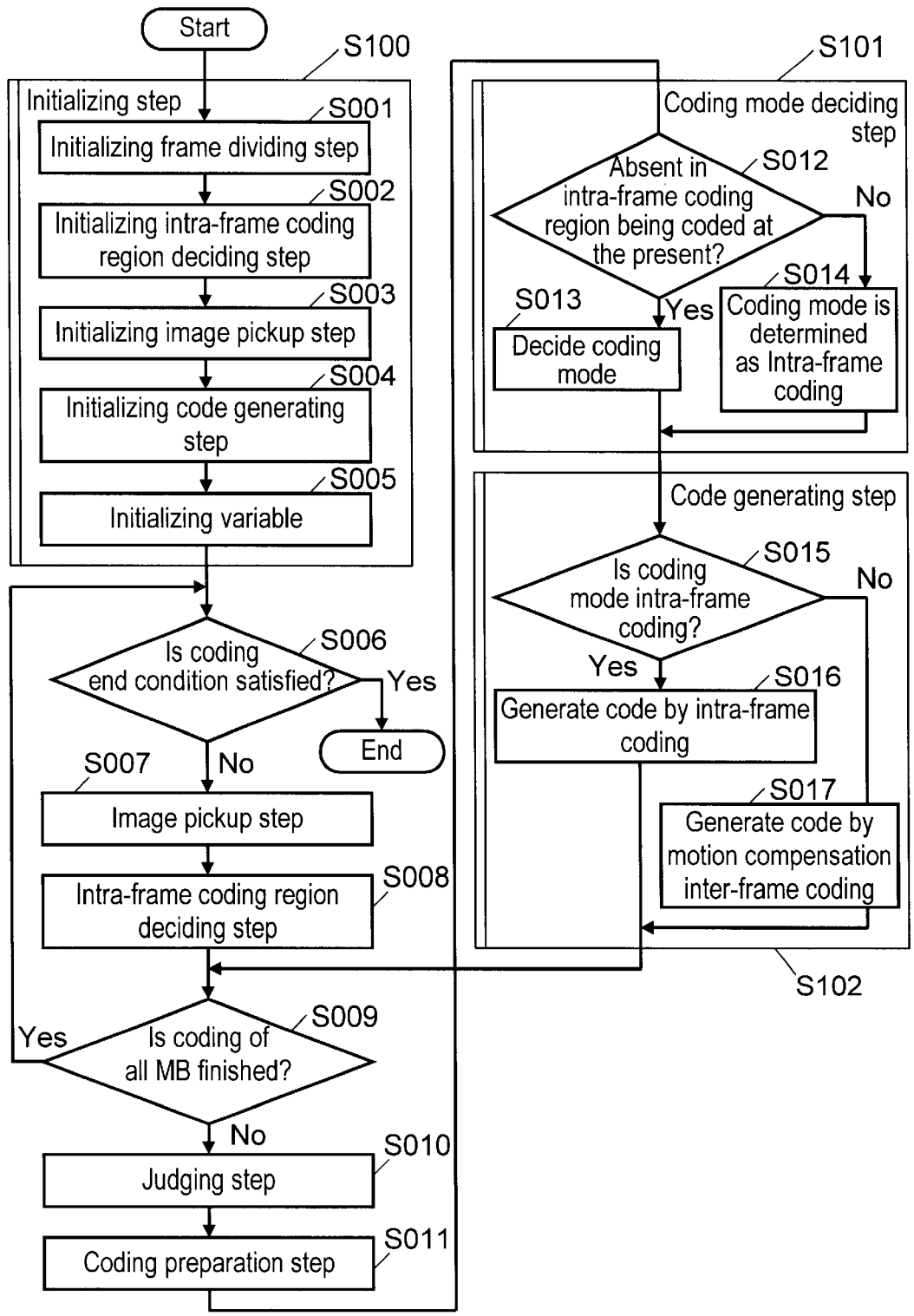
FIG. 9 is a flowchart of a program for explaining the operation of the moving image coding apparatus shown in FIG. 8.

The operation of the moving image coding device thus composed of the computer system is explained by referring to the flowchart in FIG. 9.

An initializing step S100 consists of initializing steps S001, S002, S003, S004, and S005 as described below. At initializing step S001 in frame dividing step, the predetermined frame division information is read out. At initializing step S002 in intra-frame coding region setting step, the number of divisions N of frame is determined on the basis of the frame division information obtained at initialization step S001 in frame dividing step, and at the same time it is determined in which region is included an arbitrary position in the frame. Next, the image pickup step is initialized at step S003.

At initializing step S004 in code generating step, the variable of coding amount control necessary for generating the code is initialized. At initializing step S005 of variable, the number of MBs existing in the frame to be coded is initialized and coded.

At final judging step S006, it is judged if the coding end condition is satisfied or not, and the process is terminated when satisfied.

Image pickup step S007 corresponds to the region divided from the frame number by an arbitrary method, but in this embodiment, the coding frame number is n, and the region specifying number k is the value by adding 1 to the remainder of dividing the coding frame number n by the number of divisions N of frame, and they are issued to the intra-frame coding region setting device 102.

At intra-frame coding region setting step S008, before starting frame coding, the MB for intra-frame coding among frames being presently coded is specified from the region specifying number k for intra-frame coding instructed at the image pickup step S007.

At MB coding end judging step S009, judging if coding of all MBs is terminated or not, and if terminated, the process advances to step S006, and if not terminated, the process goes to judging step S010.

At judging step S010, it is judged if the MB being presently coded is included in the intra-frame coding region or not. Coding preparation step S011 is responsible for processing motion compensation inter-frame coding such as reading out the pixel value of MB, and motion vector search.

Coding mode setting step S101 consists of steps S012, S013, and S014. At step S012, if not within the region specified by the judging result at judging step S010, the process goes to coding mode setting step S013, and if the frame being coded presently is within the region specified at the image pickup step S007, always as intra-frame coding, the process advances to setting step S014.

At coding mode setting step S013, the coding mode is determined by an arbitrary method such as comparison of motion vector and input image by statistics or the like, and it means to determine whether the MB being presently coded is to be processed by intra-frame coding or motion compensation inter-frame coding. At step S014, the coding mode is determined as the intra-frame coding.

Code generating step S102 consists of steps S015, S016, and S017. Step S015 advances to step S016 or S017 depending on the result of coding mode setting step S101. As a result of step S101, if the coding mode is intra-frame coding, step S016 executes intra-frame coding, and when the coding mode is motion compensation inter-frame coding, motion compensation inter-frame coding at step S017 is executed, and reference image is generated.

Embodiment 8

Figure 10:
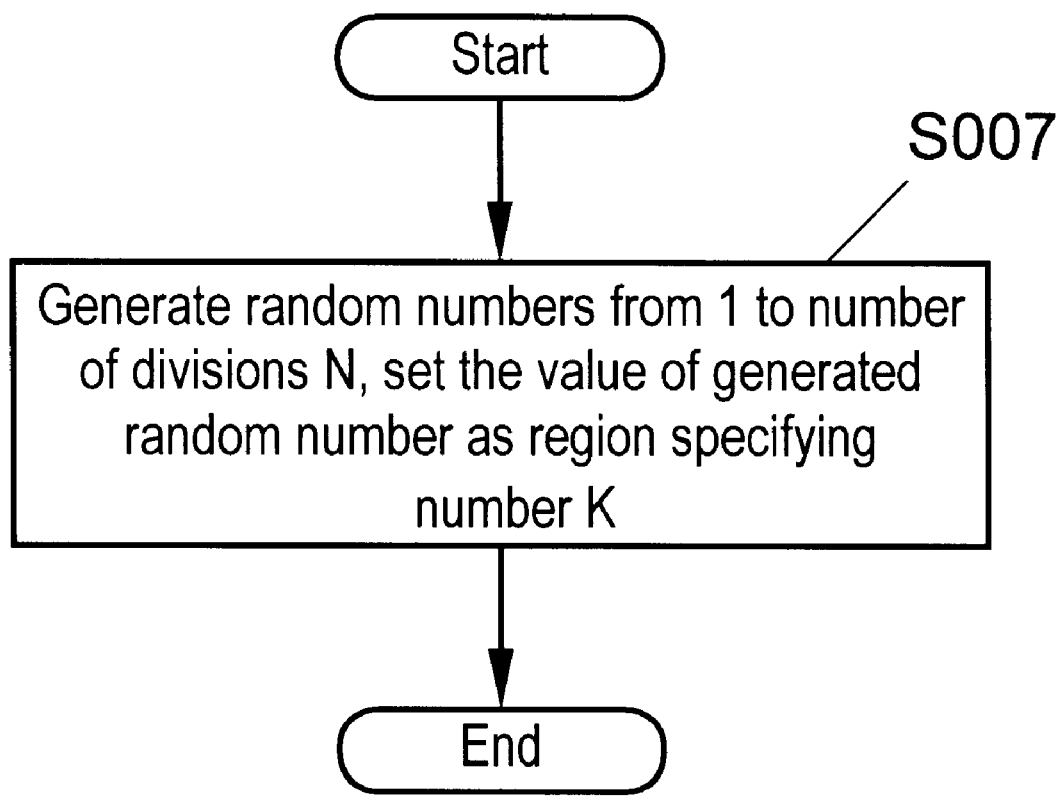
FIG. 10 is a flowchart explaining the image pickup process in embodiment 8 of the invention.
Figure 11:
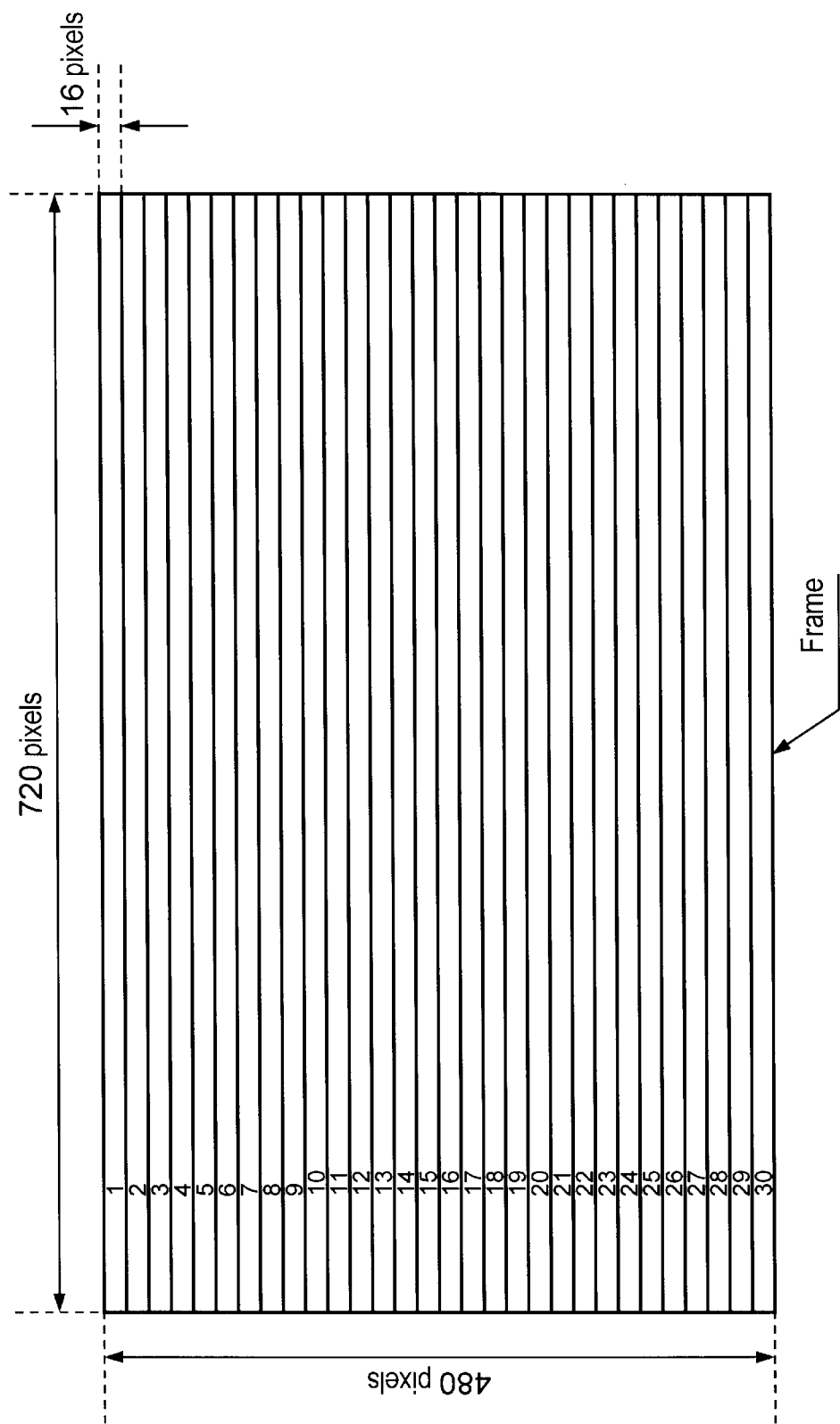
FIG. 11 is a diagram showing a coding sequence of the region of intra-frame coding in a frame according to a prior art.
Figure 12:
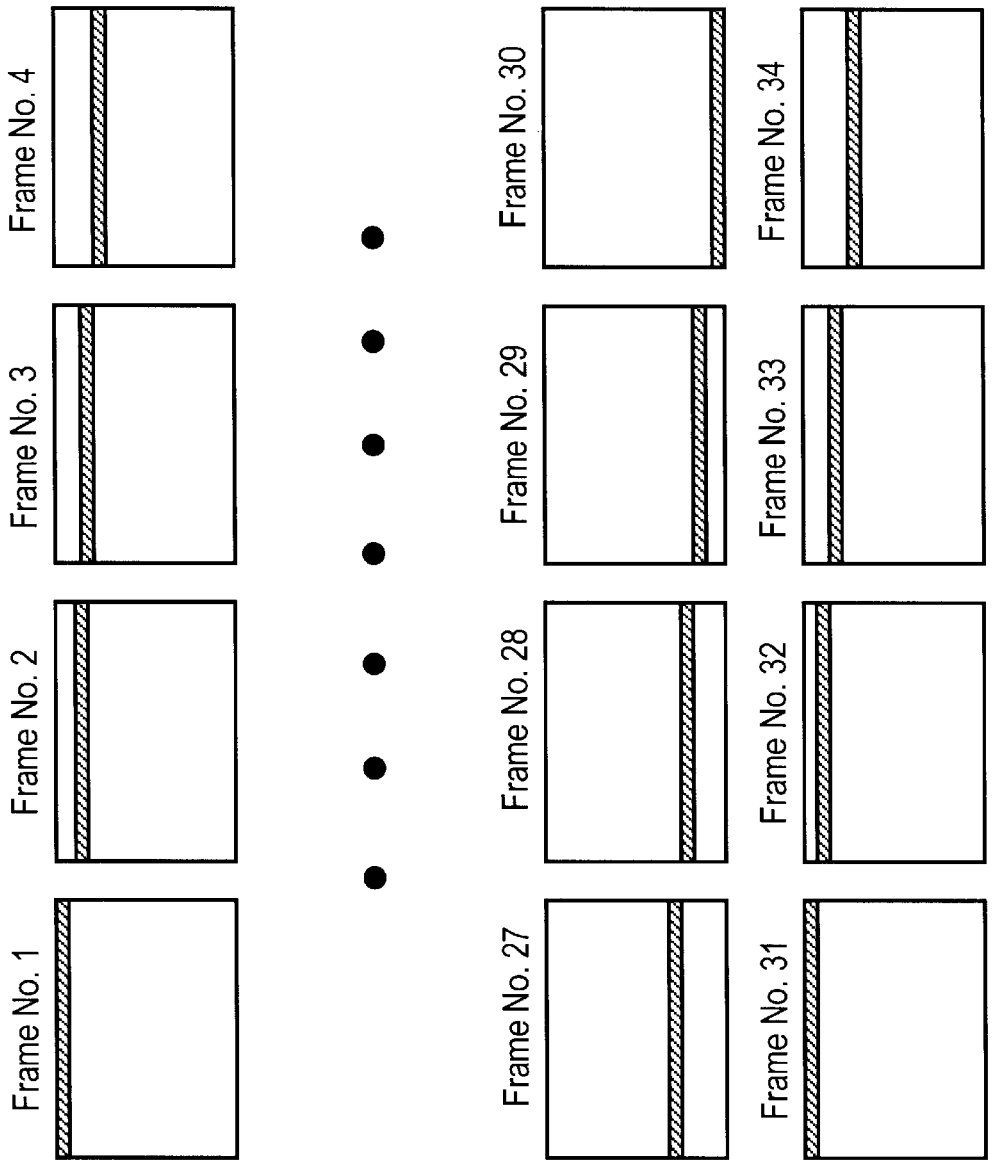
FIG. 12 is a diagram showing divisions of a frame in a prior art.

Embodiment 8 of the invention is same as embodiment 7 in procedure, except that the processing method of region specifying number k at image pickup step S007 is different, and it is explained by referring to FIG. 10.

At image pickup step S007, supposing N to be the number of divisions of frame initialized at initializing step S002 in the intra-frame coding region setting step, random numbers from 1 to N are generated, and the value of the generated random numbers is issued as the region specifying number k, and the intra-frame coding region in the frame being coded at the present is specified.

As described in the embodiments herein, according to the method of the invention, by determining the shape of the region for intra-frame coding, deciding the sequence of coding of regions of intra-frame coding, and giving the shape of regions and sequence of coding, it is effective to eliminate deterioration of image quality between the region of intra-frame coding and other region and periodic fluctuations experienced in the prior art, so that images of high image quality may be obtained.

What is claimed is:

1. A moving image coding method, being a method of coding a moving image, comprising:

a first step of dividing a frame into N regions so that each boundary may be short, a second step of selecting one of said divided regions in an arbitrary sequence in every coding frame for coding input image data, and processing all macro-blocks included in the selected region by intra-frame coding, and a third step of coding the data in other portions than said selected region according to the coding mode determined by the characteristic of the image of said coding frame.

2. The moving image coding method of claim 1, wherein one of said divided regions is selected in an irregular sequence in said second step.

3. A moving image coding method, being a method of coding a moving image by a programmed computer, comprising:

a first step of dividing a frame into N regions so that each boundary may be short, a second step of selecting one of said divided regions in an arbitrary sequence in every coding frame for coding input image, and determining the coding mode so that all macro-blocks included in the selected region may be processed by intra-frame coding, a third step of determining the coding mode of the data by the characteristic of the coding frame image in other regions than the selected region, and a fourth step of coding the data according to said coding mode.

4. A moving image coding apparatus, being an apparatus for coding a moving image, comprising:

a frame divider for dividing a frame into N regions so that each boundary may be short, an intra-frame coding region setting device for selecting one of said divided regions in an arbitrary sequence in every coding frame for coding input image data, and determining the coding mode so that all macro-blocks included in the selected region may be processed by intra-frame coding, a coding mode setting device for determining the coding mode by the characteristic of the frame image on the data in other regions than the selected region, and a code generator for coding the data according to said coding mode.

5. The moving image coding apparatus of claim 4, wherein said intra-frame coding region setting device determines the region for intra-frame coding from the frame number by specifying the divided regions in each coding frame irregularly, according to the random number sequence generated by a random number generator.

6. A moving image coding apparatus, being an apparatus for coding a moving image by a programmed computer, comprising:

a frame divider for dividing a frame into N regions so that each boundary may be short, an intra-frame coding region setting device for selecting one of said divided regions in an arbitrary sequence in every coding frame for coding input image data, and determining the coding mode so that all macro-blocks included in the selected region may be processed by intra-frame coding, a coding mode setting device for determining the coding mode by the characteristic of the frame image on the data in other regions than the selected region, and a code generator for coding the data according to said coding mode.

7. A recording medium recording a program for coding a moving image by a computer, being a computer-readable recording medium recording a moving image coding program comprising the steps of:

dividing a frame into N regions so that each boundary may be short, selecting one of said divided regions in an arbitrary sequence in every coding frame for coding input image data, and determining the coding mode so that all macro-blocks included in the selected region may be processed by intra-frame coding, determining the coding mode by the characteristic of the coding frame image on the data in other regions than the selected region, and coding according to said coding mode.

8. A moving image coding and decoding system comprising:

a moving image pickup device such as a camera, a moving image coding device including a frame divider for dividing a frame into N regions so that each boundary may be short, an intra-frame coding region setting device for selecting one of said divided regions in an arbitrary sequence in every coding frame for coding the image entered from said moving image pickup device, and determining the coding mode so that all macro-blocks included in the selected region may be processed by intra-frame coding, a coding mode setting device for determining the coding mode by the characteristic of the frame image on the data in other regions than the selected region, and a code generator for coding the data according to said coding mode, a code transmitter for transmitting the signal coded in said moving image coding device, and a moving image decoding device for receiving the coded signal transmitted from said code transmitter, decoding to restore the moving image, and displaying on the monitor or recording in a recording device.

9. A moving image coding method characterized by dividing a frame into N regions composed of a plurality of macro-blocks as basic units of coding, selecting one of said divided regions in an arbitrary sequence in every coding frame for coding input image, coding all macro-blocks included in said selected region by intra-frame coding, and coding other portions than said selected region by the coding mode determined by the characteristic of the coding frame image, wherein in the region coded by intra-frame coding, the macro blocks in the region are arranged so as to form a link region, and the macro blocks are arranged so that the longer side of the minimum rectangle for enclosing the entire link region may be minimum.

10. A moving image coding method characterized by dividing a frame into N regions composed of a plurality of macro blocks as basic units of coding, selecting one of said divided regions in an arbitrary sequence in every coding frame for coding input image, coding said selected region by intra-frame coding, and coding other portions than said selected region by the coding mode determined by the characteristic of the coding frame image, wherein in the region coded by intra-frame coding, the macro-blocks are arranged so as to form a link region, and the macro blocks are arranged to satisfy the following relation $$Sqrt(M) \leq R \leq Sqrt(M) \times 1.3$$

where M is the area of the macro-blocks included in the link region, and R is the longer side of the minimum rectangle enclosing the entire region.

11. A moving image coding method characterized by dividing a frame into N regions composed of a plurality of macro blocks as basic units of coding, selecting one of said divided regions in an arbitrary sequence in every coding frame for coding input image, coding said selected region by intra-frame coding, and coding other portions than said selected region by the coding mode determined by the characteristic of the coding frame image, wherein in the region coded by intra-frame coding, the macro blocks are arranged so as to form a link region, and when the number of links of each macro block in the region is not 0 and the number of macro blocks included in the region is 6 or more, the macro blocks are arranged so as to form at least one macro block of which number of links is 3.

12. A moving image coding method characterized by dividing a frame into N regions composed of a plurality of macro blocks as basic units of coding, selecting one of said divided regions in an arbitrary sequence in every coding frame for coding input image, coding all macro-blocks included in said selected region by intra-frame coding, and coding other portions than said selected region by the coding mode determined by the characteristics of the coding frame image, wherein in the region coded by intra-frame coding, the macro-blocks are arranged so as to form a link region, and the macro blocks are arranged so that the number of links of each macro block in the region is not 0, and that the total sum of the number of links of each macro block may be maximum in the sum in each macro block in the region.

\* \* \* \* \*